April 9, 1963 H. L. ADLER 3,084,984
MOISTURE RESISTANT CONTAINER
Filed Aug. 26, 1960
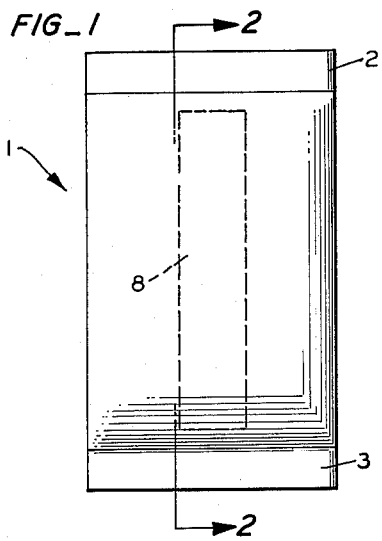
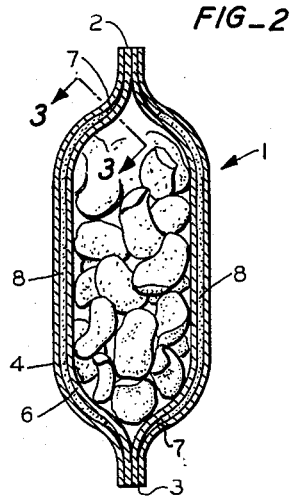
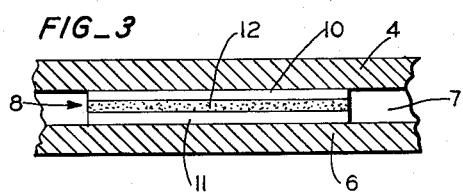
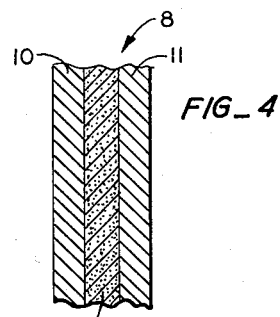
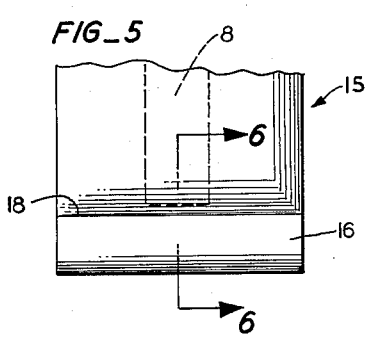
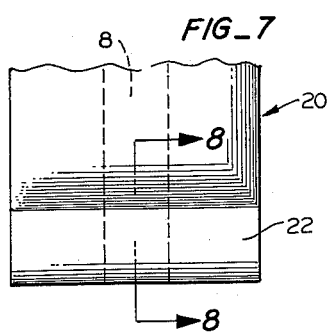
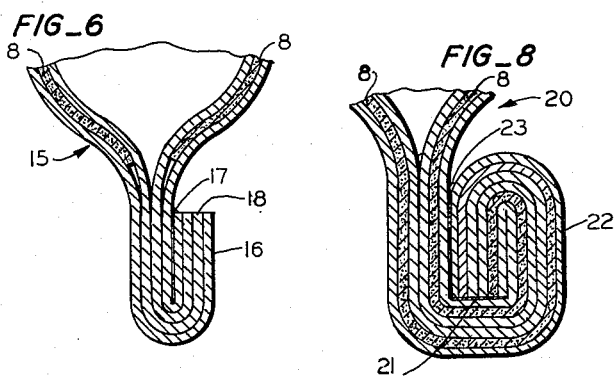
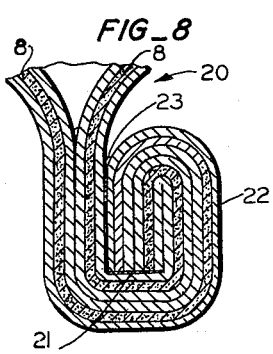
INVENTOR.
HOWARD L. ADLER
BY Bialos & Schlemmer
ATTORNEYS 3,084,984
MOISTURE RESISTANT CONTAINER
Howard L. Adler, Walnut Creek, Calif., assignor to Crown Zellerbach Corporation, San Francisco, Calif., a corporation of Nevada
Filed Aug. 26, 1960, Ser. No. 52,199
6 Claims. (Cl. 312—31)

This invention relates generally to a container construction and more particularly to a bag type container for packaging generally dry products, such as edible food products.

In the packaging of dry, crisp food products, such as potato chips, corn chips, peanuts and the like, a problem frequently is encountered in moisture being absorbed into the product, rendering the same soggy and undesirable for consumption. While generally such products are packaged in containers the walls of which comprise moisture resistant material, when such packages are stored for extended periods of time under humid conditions, such moisture resistant material has proved ineffective to completely preclude the entry of moisture through the wall structure of the container so that moisture may be absorbed by the packaged product. That is, while the moisture resistant material heretofore employed for the container wall structure may be effective for relatively short periods of time to preclude moisture passage into the container interior, upon prolonged exposure to moisture, such as during storage upon a grocer's shelf under humid weather conditions for a period of several days to several weeks, the moisture absorption problem is not adequately corrected by conventional containers.

The shelf life of packaged food products is largely determined by the moisture resistance of the wall structure of the product containers. While fluid impervious container wall structures may be employed to minimize absorption, such as walls comprised of metal foils and the like, the expense of such impervious wall materials generally precludes their use for packaging of food products in the small packages which sell for a nominal fee. Furthermore, while completely impervious containers can be devised, such containers are not generally necessary because the products packaged generally are sold and consumed within relatively short times of not more than several weeks. Accordingly, relatively inexpensive wax impregnated paper or thermoplastic films which have short term moisture resistance frequently are employed as the principal component for dry food containers. It has been known heretofore that by employing several layers of such wax impregnated paper or films that the moisture absorption problem can be minimized and the shelf life increased. However, even in such multi-wall containers the moisture problem heretofore employed has not been corrected the desired amount by inexpensive means to give a long shelf life to the product packaged.

Accordingly, the present invention relates to and has as its objects the provision of a container package, and particularly to the wall structure thereof which incorporates desiccating means therein which has been found effective in correcting the moisture absorption problem encountered in packaging dry products so that the dryness and crispness thereof may be retained over extended periods, and so that the product, when the same is a food product, may be precluded from becoming rancid or soggy over an extended period. Additionally, an object hereof is the provision of novel desiccating means to be incorporated into a container for absorbing moisture to which said container may be exposed.

These and other objects will become apparent from studying the following specification in which reference is directed to the accompanying drawings.

FIG. 1 is a side elevational view of a container embodying the subject invention.
FIG. 2 is a sectional view of the subject container taken in the plane of line 2—2 of FIG. 1.
FIG. 3 is a sectional view through the wall structure of the container on an enlarged scale.
FIG. 4 is a partial sectional view on an enlarged scale through a multi-ply moisture absorbing strip which is to be employed with the subject container.
FIG. 5 is a partial side elevational view of an end of a modified container construction.
FIG. 6 is a sectional view taken in the plane of line 6—6 through the modified construction of FIG. 5, on an enlarged scale.
FIG. 7 is a partial side elevational view of an end of another modified container construction.
FIG. 8 is a sectional view taken in the plane of line 8—8 of the container of FIG. 7, on an enlarged scale.

While hereinafter reference is directed primarily to flexible bag type containers, it should be understood that the subject invention may be employed with containers other than bags, such as rigid paperboard boxes or the like, and the wall structure and desiccating means disclosed herein is equally well adapted for use in such other containers.

Crisp and dry food products, such as potato chips, corn chips, peanuts and the like, heretofore have been packaged primarily in wax treated bags of single wall or multi-wall construction. Over relatively short periods of time such wax bags are capable of retaining the packaged product in its original fresh and crisp condition. However, if such bags are stored, for example on a grocer's shelf, for extended periods of time, and if during such storage the packages are subjected to humid conditions, it has been found that the wall structure of the prior art bags is not capable of precluding moisture passage through the wall structure into the interiors of the bags. As a result, the product packaged frequently becomes soggy and possibly rancid, and accordingly inedible.

While some attempts have been made to incorporate a desiccant into packages of dry products, such desiccant heretofore was inserted directly into the package interior in contact with the packaged product. When desiccant is thus packaged with food products, the danger of product contamination is present, even if the desiccant is wrapped in its own container.

With the subject invention, however, desiccating means is incorporated into a container package but such means is maintained out of direct contact with the packaged product. That is, the desiccant desirably is incorporated into the wall structure of the container. As a result, the wall structure is provided with a moisture absorbing material which collects moisture which tends to pass through the wall structure and retains the same out of contact with the product so that the crispness and dryness of the product is not adversely affected.

Accordingly, the shelf life of the packaged product is increased by use of this invention so that the product is retained in its dry, crisp condition for prolonged periods. Additionally, because the material from which the container wall panels are manufactured is generally the same as heretofore employed, such as waxed paper or thermoplastic films, the unit price of each bag is not appreciably increased in that the moisture absorbing material employed therewith is readily available at relatively low cost.

In summary, the subject invention relates to the interposition of desiccating means between the plies of a moisture resistant wall structure of a bag or like container so that any moisture which passes through the outer ply of the wall structure is attracted to and absorbed by the desiccant and precluded thereby from passing through the inner ply of the wall structure into contact with the product packaged for extended periods. The construction of the moisture absorbing desiccant means is such that moisture absorbed thereinto is distributed over a relatively large area so that moisture does not accumulate or "pool" in one spot, which would increase the likelihood of such moisture passing into the bag interior.

Referring to FIG. 1, potato chips and like dry food or other products frequently are packaged in pouch-type bag containers 1 which have their opposite ends heat sealed or otherwise adhesively closed as shown at 2 and 3. As illustrated in FIGS. 2 and 3, frequently such bags are of multi-wall construction comprising an outer panel of ply 4 and inner panel or ply 6 of moisture resistant material, such as wax paper, glassine or thermoplastics. Generally inner and outer plies 4 and 6 are free of adhesive union with each other between opposite bag ends although the same are generally in face-to-face contact. As a result, a void space or gap 7 is available between such plies. Such void space is substantially continuous and extends around the bag between the wall plies thereof.

The subject invention relates primarily to the interposition of moisture absorbing material in the space available between the inner and outer plies of the container wall structure so that any moisture which may pass through outer ply 4 will be drawn toward and trapped and retained between the plies by the absorbing material so that such moisture will not pass through the inner ply 6 into contact with the product packaged.

While the moisture absorbing material chosen may take various forms, such as loose pellets or grains of desiccant, or sheets of desiccant impregnated material, impregnated sheets are most desirable because of their ease of handling and because use thereof does not adversely affect the appearance of the package. The sheets of moisture absorbing material chosen also may be of various sizes and shapes but it has been found that relatively narrow strips are adequate for the intended purpose.

As shown in FIG. 2, if desired more than one such strip 8 may be employed in each container, and in the embodiment illustrated two are utilized, one in each of the opposing walls which make up the pouch type container.

It will be noted from FIGS. 1 and 2 that desirably the strips extend substantially the full length of the bag but terminate within the confines of the sealed ends 2 and 3 thereof. That is, the ends of the moisture absorbing strips 8 are not exposed to the atmosphere surrounding the bag so that no moisture will be drawn into the strip ends from the surrounding atmosphere. As a result, so called "wicking" of moisture into the strips through their ends from the atmosphere is precluded.

While the desiccant strip employed may take one of several constructions, it has been found desirable to employ a multi-ply sheet as shown in FIGS. 3 and 4.

Each desiccant strip desirably comprises a pair of outer plies 10 and 11 between which is sandwiched an inner ply 12. Desirably inner ply 12 is impregnated with a desirable desiccating material, such as calcium chloride, sodium sulphate or the like. The respective plies of the strip desirably are of fibrous material, such as the absorbent paper of the type commonly used for toweling or facial tissues.

The outer plies 10 and 11 of the moisture absorbing strip are free of impregnation with the desiccant material. As a result, moisture which may pass through the outer panel 4 of the container wall structure is attracted by the desiccant impregnated inner ply 12 of the strip 8 and such moisture is distributed along the length of the strip by the two untreated plies 10 and 11 thereof. As a result, moisture is not collected at a single point but rather is distributed generally along the length of the package. By eliminating "pooling" of the moisture thus accumulated, spotting and marring of the bag appearance is obviated.

The width and length of the desiccant strip employed may vary depending upon the size of the container and the various materials employed for the wall structure. However, as one specific example of the subject invention set out solely for purposes of illustration and not intended to be limiting, in a standard size 8 x 13 inch bag filled with approximately 4¼ ounces of potato chips, two desiccant strips of the three-ply construction illustrated have been found suitable, each of which is four inches wide by 10 inches long. The middle ply of each strip is impregnated with a 50% calcium chloride solution. The strips desirably are placed between inner and outer waxed paper panels of a bag at opposite locations thereof.

For test purposes, such a sealed package has been subjected to humid conditions at 80° F. and 80% relative humidity for extended periods. After seventeen days' storage under such humid conditions, the moisture content of the potato chips packaged has been found to be only 1.53% while the moisture content of a similar quantity of potato chips packaged in a similar wax paper bag which did not include the two desiccant strips increased 3.24%.

As a result of the use of desiccant means between the container wall panels the shelf life of the packaged product is greatly increased, more than doubled with the specific example set out. While absorbent paper has been found suitable for the multi-ply absorbing strip, it should be obvious that other absorbent materials also could be employed. Similarly, single ply, double ply, or more than triple ply absorbent strips also could be utilized, either selectively treated with desiccant or untreated.

Because it has been found suitable that narrow strips of desiccant material perform the intended function in the subject containers, larger sheets of desiccant are generally unnecessary but could be employed if desired. Use of strips is highly desirable because the strips may be incorporated with the container wall structure at the same time the containers are being formed and filled on automatic machinery well known for that purpose. It generally has been found to be unnecessary to secure the strips between the wall panels because the contact of the panels therewith normally is sufficient to maintain the strips longitudinally arranged as shown in FIG. 1.

While in the embodiment shown in FIGS. 1 and 2 the opposite ends 2 and 3 of the container extend straight and unfolded in so called fin type seams, if desired the container ends may be sealed by folding the same upon themselves and adhesively securing the extremities thereof to the container body. As shown in FIGS. 5 and 6, a bag 15 could be provided with an upwardly folded end 16 which is adhesively secured by a layer of any suitable adhesive 17 to the body of the bag. In this construction, the desiccant strips 8 as noted previously terminate short of the bag extremity 18 so that wicking of moisture from the atmosphere into the desiccant strips will be precluded.

If desired for manufacturing convenience, the strips of desiccating material may be substantially coextensive with the bag. That is, the strips may extend to the outer extremity of the bag. However, for the reasons noted previously, with such construction it is necessary to preclude the possibility of moisture wicking into the strips through the ends thereof. As shown in FIG. 7, where the strips of moisture absorbing material 8 of bag 20 are coextensive with the bag and terminate flush with the bag extremity 21, the wicking problem may be precluded by doubling back the bag end upon itself as at 22 and adhesively or otherwise securing the bag extremity 21 within the folded end. That is, the end of bag type container 20 is provided with a double folded end 22 with a pair of desiccant strips folded therein which terminate substantially flush with the extremity 21 of the bag. To preclude wicking through such strip ends, the bag end is double folded upon itself as shown in FIG. 8 and the strips are adhesively sealed in engagement with the bend of the fold so that the ends of the strips are isolated from the atmosphere surrounding the bag. If desired, a continuous layer of adhesive 23 may be employed for sealing the ends of strips 8 and for holding the bag end in its folded condition. As a result, wicking through the strip ends is precluded even though the strips are coextensive with the bag.

While several embodiments of the subject invention have been disclosed herein, it should be understood that other embodiments which may become apparent to a person skilled in the art are intended to fall within the purview of this invention and the same should be interpreted in light of the appended claims.

I claim:

1. A moisture resistant container having opposing walls, each of said walls comprising a pair of flexible moisture resistant inner and outer wall panels which are at least partially in contact with each other between opposite ends of said container but which are generally free of bonded engagement with each other between said container ends so that a moisture trap space is provided therebetween, and a thin, flexible self-supporting desiccating sheet of moisture absorbing material interposed between the panels of at least one of said opposing container walls in the moisture trap space therebetween for attracting and distributing moisture which may pass through an outer wall panel into such trap space; said sheet of moisture absorbing material comprising a plurality of contacting plies of thin absorbent fibrous material the combined thickness of which does not appreciably increase the thickness of said one container wall, at least one of said plies including a desiccant carried thereby and distributed therealong, the remaining plies of said sheet being free of desiccant, said ply which carries said desiccant being adapted to attract moisture which may pass into said moisture trap space and the remaining plies of said sheet being adapted to distribute such attracted moisture throughout said sheet to preclude localized accumulation of moisture in said sheet.

2. The container of claim 1 in which said container is of the bag type having two opposed integrally connected walls to be sealed together at said opposite container ends, each of said bag walls having a sheet of said moisture absorbent desiccant material in the moisture trap space between the inner and outer panels of each said wall.

3. A moisture resistant bag type container having two opposed integrally connected walls to be sealed together at opposite ends of said container, each of said walls comprising a pair of flexible inner and outer wall panels of moisture resistant material which are at least partially in contact with each other between said opposite ends of said container but which are generally free of bonded engagement with each other between said container ends so that a moisture trap space is provided therebetween, and a thin, flexible self-supporting desiccating sheet of moisture absorbing material interposed between the panels of at least one of said container walls in the moisture trap space therebetween for attracting and distributing moisture which may pass through an outer wall panel into such trap space; said sheet of moisture absorbing material comprising a plurality of contacting plies of thin absorbent fibrous material the combined thickness of which does not appreciably increase the thickness of said one container wall, at least one of said plies including a desiccant carried thereby and distributed therealong, the remaining plies of said sheet being free of desiccant, said ply which carries said desiccant being adapted to attract moisture which may pass into said moisture trap space and the remaining plies of said sheet being adapted to distribute such attracted moisture throughout said sheet to preclude localized accumulation of moisture in said sheet and to preclude chemical attack on said wall panels by said desiccant.

4. The bag of claim 3 in which said moisture absorbing sheet extends substantially the full length of said bag but terminates within the marginal confines of the bag wall in which it is positioned so that said sheet is not exposed at said opposite bag ends, whereby wicking of moisture into said sheet from the atmosphere surrounding said bag is precluded.

5. The bag of claim 3 in which said moisture resistant wall panel material is waxed paper.

6. A moisture resistant bag type container having two opposed integrally connected walls to be sealed together at opposite ends of said container, each of said walls comprising a pair of flexible inner and outer wall panels of moisture resistant material which are at least partially in contact with each other between said opposite ends of said container but which are generally free of bonded engagement with each other between said container ends so that a moisture trap space is provided therebetween, and a thin, flexible self-supporting desiccating sheet of moisture absorbing material interposed between the panels of at least one of said container walls in the moisture trap space therebetween for attracting and distributing moisture which may pass through an outer wall panel into such trap space; said sheet of moisture absorbing material comprising three contacting plies of thin absorbent fibrous material the combined thickness of which does not appreciably increase the thickness of said one container wall, one of said plies lying between two other plies and being impregnated with a desiccant carried thereby and distributed therealong, the two remaining plies of said sheet being free of desiccant, said one ply which carries said desiccant being adapted to attract moisture which may pass into said moisture trap space and the two remaining plies of said sheet being adapted to distribute such attracted moisture throughout said sheet to preclude localized accumulation of moisture in said sheet and to preclude chemical attack on said wall panels by said desiccant.

References Cited in the file of this patent

UNITED STATES PATENTS

| | | |
|---|---|---|
| 1,222,656 | Moyer | Apr. 17, 1917 |
| 1,657,272 | Neusbaum | Jan. 24, 1928 |
| 2,524,162 | Chavannes et al. | Oct. 3, 1950 |
| 2,545,710 | Snyder | Mar. 20, 1951 |